April 26, 1927.                                                        1,626,318
K. WETTSTEIN
METHOD OF MAKING REENFORCED BUILDING ELEMENTS
Filed July 18, 1924                4 Sheets-Sheet 1

April 26, 1927. 1,626,318
K. WETTSTEIN
METHOD OF MAKING REENFORCED BUILDING ELEMENTS
Filed July 18, 1924  4 Sheets-Sheet 2

Inventor
Karl Wettstein
By
Atty.

Inventor
Karl Wettstein
By [signature]
Atty.

April 26, 1927. 1,626,318
K. WETTSTEIN
METHOD OF MAKING REENFORCED BUILDING ELEMENTS
Filed July 18, 1924 4 Sheets-Sheet 4
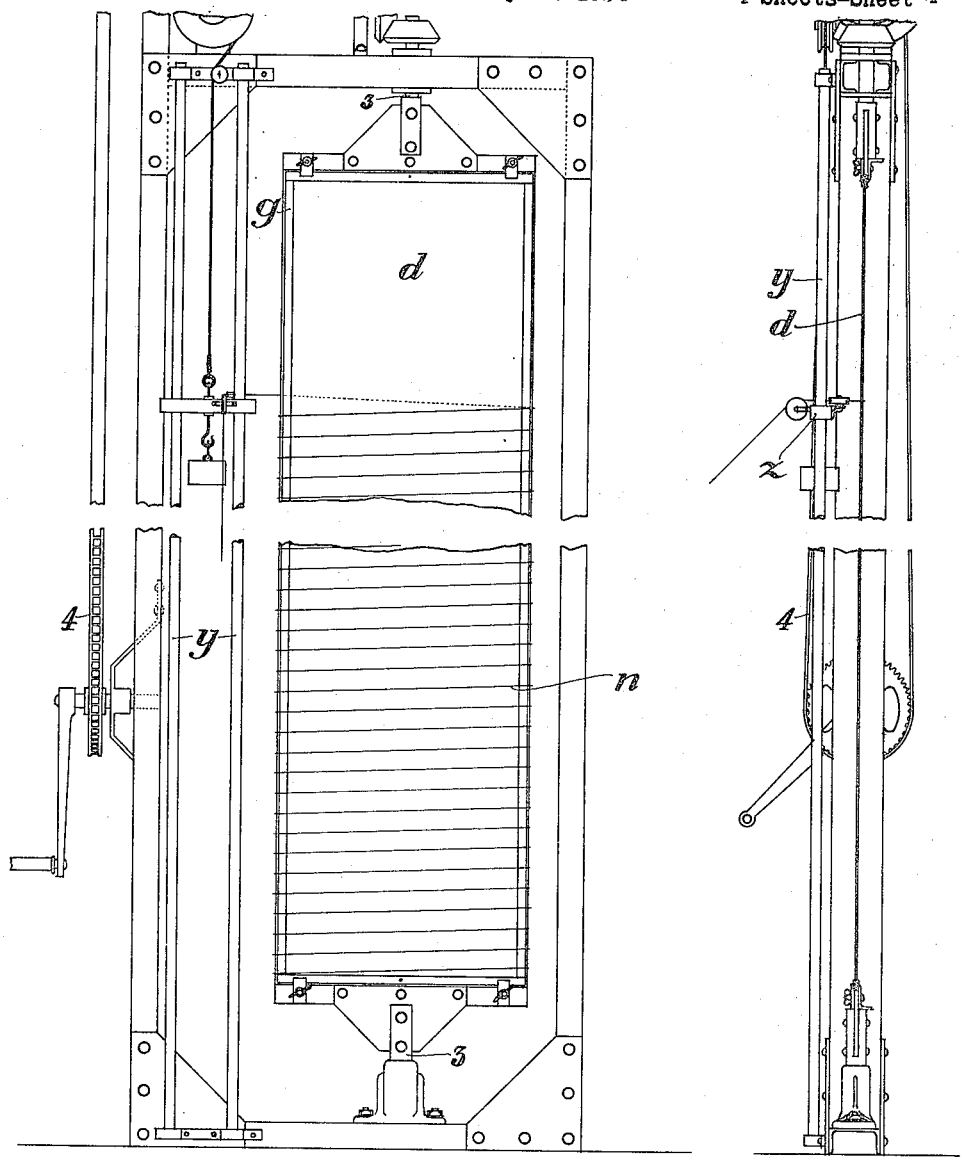
Fig. 25.   Fig. 26.
Fig. 27
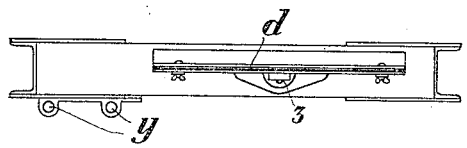
Inventor
Karl Wettstein
By
Atty.

Patented Apr. 26, 1927.

1,626,318

UNITED STATES PATENT OFFICE.

KARL WETTSTEIN, OF BRUX, CZECHOSLOVAKIA.

METHOD OF MAKING REENFORCED BUILDING ELEMENTS.

Application filed July 18, 1924. Serial No. 726,797.

The invention relates to the making of plane and curved elements supplied with fine surface reenforcement arranged in special manner.

These elements, such as plates, slabs, laths, gullies, pipes etc., are made of setting or hardening (ceramic) materials in the factory, or structural members as floors, ceilings or walls may be made of cement, plaster of Paris, corkstone, magnesite or other setting materials on the job, and different materials for reenforcement used.

Reenforcement of concrete bodies at their middle or at a certain distance from the surface that is subjected to tension by bars of iron, or by wires of 3-6 mm. diameter is known.

According to the present invention however, I distribute filamentous reenforcement of supporting elements of small thickness and easily bent, wound and cut substantially at their surface, for the purpose of making the whole thickness of the construction effective and for getting a very homogeneous bond between the reenforcement and building material or coating to be applied thereto.

The present invention results in a complete method and means for the reenforcement of plane and of curved bodies, at the plant or at a building site, with the most suitable reenforcing material for each particular case by means of mould plates or mould sheets, preferably provided with spacing ledges or strips at the margins. Before using them as a single mould or mould-lining, or before assembling them into a multiple mould the reenforcing material is put directly on or at a small distance from the surface.

The bodies or structural members made by this process have their reenforcements at or near the surface but at the edges of the members the reenforcements lie below the surface and finally project beyond the edges. This embedding has the purpose of protecting the reenforcement as much as possible from coming loose, and the projecting portion of the reenforcement enables an efficient joint to be made with neighboring moulded bodies or elements. The ends of the wire or other reenforcement of adjacent elements do not have to be positively connected together as by interlocking or twisting or tying them together. Simple overlapping and the filling of the joint with cement mortar is sufficient.

I am aware that plates of plastic materials have been made in which the reenforcements were embedded in the middle of the plates and project from the edges to connect with the adjacent plate, the joint being filled with cement. Concrete pipes have been similarly connected. This is purely tension connection.

My invention comprises, however, placing fine wire reenforcements at both surfaces of the element to form an encasing and reenforcing layer but not projecting therefrom, and the formation of a joint for building elements that shall sustain loads, and to such specific features as the construction of the plates or slabs having their reenforcment more deeply embedded at the edges of the slab; the manner of placing the reenforcement on the slabs; the special manner of using endless threads or fine wires on the slabs or forms, and the manner of using the crossed wires or woven mesh.

My invention also relates to the manufacture of building elements reenforced on one side only; to the manufacture of curved moulded bodies; and to the manner of making solid joints for connecting pipes made of semi-cylindrical parts, as will be more particularly described.

According to my invention elastic slabs can be made on a manufacturing scale of only 10 and 8 mm. thickness and 2 and 3 m. long, on the job; as well as gullies, pipes and columns, and continuous pipes for the laying of electric cables, as well as continuous roofings, reenforced ceilings and walls.

In the accompanying drawings, in which like parts are similarly designated—

Figs. 25–27 are respectively, elevation, side view and plan of a device for winding the reenforcements on a form.

The object of the invention is to form reenforced building elements, either plane or curved, that shall have their fine reenforcements at their outer surfaces but not projecting therefrom over the greater part of such surfaces, the reenforcements being embedded in the element at the margins or sides thereof and projecting from the edges. This construction has the following advantages:

The reenforcements being embedded around the sides of the slab or other element are thus prevented from breaking away or coming loose.

The ends of the reenforcements protrude from the edges more nearly at the middle of the edge of the element and thereby facilitate the insertion of cement or the like at a joint between two adjacent elements to make a smooth finish;

The reenforcements will, in the finished structure, lie close to the outer surfaces where the greatest tension will lie; the core of the slabs will therefore be homogeneous and can sustain greater compression strains than when the reenforcements are distributed through it.

Figure 1:
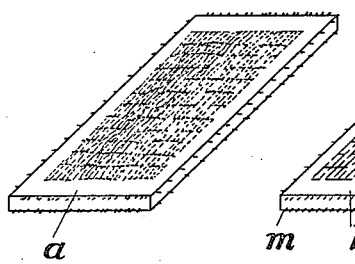
Figures 1 and 2 illustrate slabs with wire or fiber reenforcement on both faces.
Figure 2:
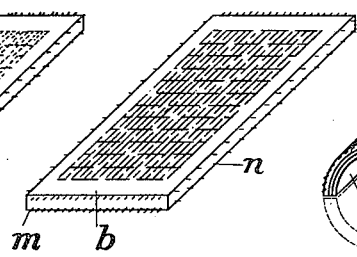

The slab $a$, Fig. 1, has a fibre reenforcement, and the slab $b$, Fig. 2, a thread or wire reenforcement $m$, projecting from the ends of the slab, and the cross wires or threads $n$ project from the edges of the slab. These reenforcements are more or less exposed on the faces of the slabs within the margins that contain no exposed reenforcing elements which at these points lie nearer the middle plane of the slab and project from the edges.

The moulds for making such slabs may be assembled in various ways, and as shown in Figs. 8 to 11 and 17 comprise thin, flat mould sheets $d$ of wood or metal around the edges of which and alternating with the plates are placed tongued or grooved spacing elements $f$. The plates with the spacing elements between are stood vertically on their longitudinal edges.

These reenforcements, when they consist of short fibres, such as hemp, animal hair, asbestos, cocoanut fibre, bast and similar fibres, that are customarily used for insulating purposes, are placed along the side of the mould as the filling progresses. The filling is poured into the moulds and consists of the usual quaking or soft mixtures of cement, cement mortar and the like customarily used in making similar building elements, and the mould is preferably shaken or jarred during filling to eliminate voids.

Instead of placing the reenforcements during the filling of the mould, sheets may be coated, before assembling, with a thin layer of fibres mixed with cement, which sets or finishes setting along with the cement poured in after the so-coated sheets have been assembled.

The reenforcements if of suitable individual length or of wire mesh may be assembled with the mould by placing spacing strips $g$ preferably but not necessarily, secured to the sheets or plates around their margins and between these strips or distance ledges and the tongued or grooved parts $f$ of the mould. If the wires or mesh $m$ are loose, i. e., not tightly stretched, the cement mixture when poured into the mould will move them into contact with the mould sheets, so that in the finished slab they will lie at the surface, except at the margins of the slab, where they are held beneath the slab surface by the spacing strips $g$.

If the reenforcements are tightly stretched, then I use a stretcher consisting of a sheet of metal $t$ to temporarily hold the reenforcements at or against the sides of the mould, and which is withdrawn before the material of the slab sets.

Figure 6:
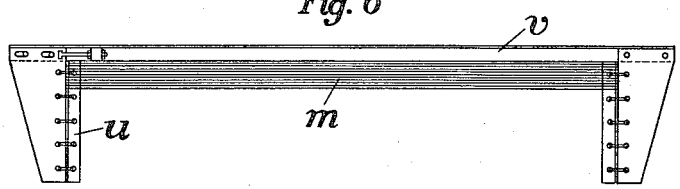
Fig. 6 shows the apparatus for removing threads for the special case where removable edge-ledges are used.
Figure 5:
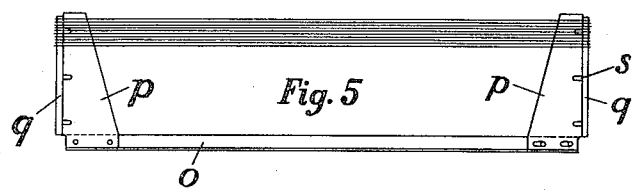
Fig. 5 is a view of a stringing frame on which the threads or wires are wound and by which the threads or wires are to be placed in the mould.
Figure 7:
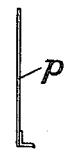
Fig. 7 is a cross section through a wing of the stringing frame.
Figure 8:
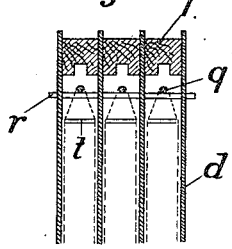
Fig. 8 is a section through the corner of a mould with thread or wire reenforcements stripped from the stringing frame and put into the mould.

Instead of winding the form plate directly in crossed directions, this plate can be wound in one direction and the fine wire or cord for the other direction wound under tension on a special device, Figs. 5 and 6, and this wound form inserted between the two adjacent windings made on the special device when assembling the mold.

To facilitate the placing of the reenforcements I use a stringing frame for winding the wire reenforcements, Fig. 5, comprising a longitudinal member or angle iron $o$ on the ends of which are upstanding arms or metal plates $p$ provided with notches $s$. One of the plates $p$, the one on the right hand end of the bar $o$ is capable of slight adjustment by a bolt and slot connection for withdrawing it slightly toward the middle of the bar $o$.

Bars $q$ are placed against the external edges of the arms $p$ and wire is wound and suitably spaced around the two arms and bars $q$ as illustrated. Then the frame is wound from top to bottom, or vice versa, with reenforcement wire or cord and placed in a mould cavity, and rods $r$ are passed through the mould plates $d$ and the slots $s$. The movable arm $p$ is released and slightly withdrawn and the frame removed, leaving the bars $r$ holding the rods $q$ that support the wires. The mold plates $d$ either wound or not, are assembled with the windings $m$, as shown in Figs. 5–10. The bars $r$ serve also to clamp the mould sections together; after the wires have been placed in the mould cavity a spreader $t$ is inserted to hold them against the sides of the mould. After pouring, and before the mixture has set, the spreaders $t$ and rods $q$ are withdrawn.

In this manner slabs can be cast without the use of spacing strips $g$.

Figure 9:
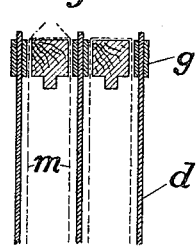
Fig. 9 is a cross section of a portion of a mould where the wooden tongue or grooved edges themselves serve as removable parts of the stringing-frame.

In place of the bars $q$ I may use the tongued or grooved mould edges $f$ which are to form the ends of the mould, in which case the wires extend across these mould edges as in Fig. 9, and have to be cut on the outside of the mould, as indicated, before the mould is taken apart, thus leaving the reenforcement projecting from the edges of the finished cast body a distance below the side faces of the slab equal to the thickness of the spacing strip $g$.

Figure 10:
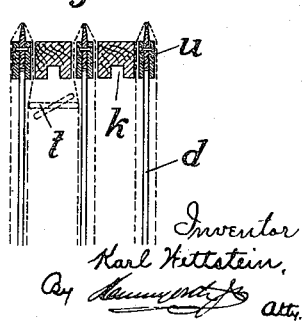
Fig. 10 is a cross section of part of another form of mold.
Figure 11:
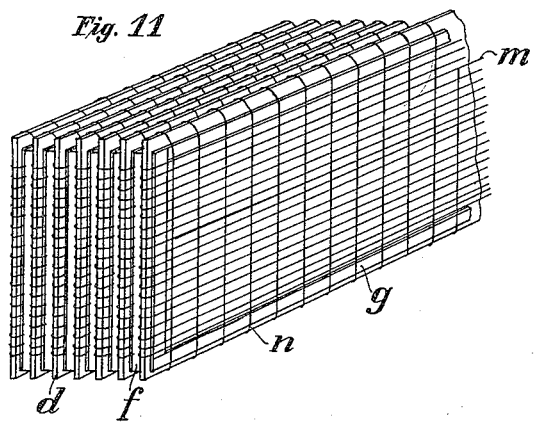
Fig. 11 shows a composite mould in perspective, for making slabs.
Figure 12:
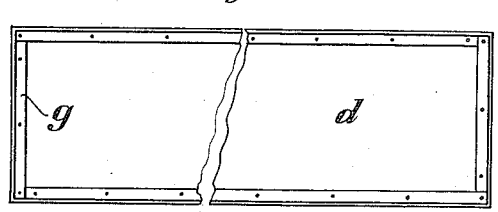
Figs. 12 and 13 show, respectively, an elevation and a longitudinal section of a number of moulding plates arranged to form one mould.
Figure 13:
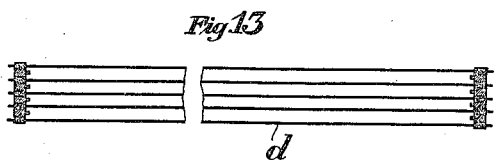

In Fig. 10 the edges of the mould sheets are provided with removable edges $u$ composed of a metal strip flanked by and projecting beyond two spacing strips. The spacing strips are offset from the edge of the metal strip on the outside of the mould and project beyond the opposite edge of said metal strip into the interior of the mould to form a groove for the reception of the edge of mould sheet $d$.

These removable mould sheet edges are placed on the winding frame $o$ the plates $p$ entering the groove thereof, and are wound with wire. I then clamp or otherwise connect to the edges $u$ so wound a frame $v$, Fig. 6, and remove them from the winding frame, Fig. 5, and slip them over the edges of the mould side $d$. The frame $v$ is removed, and the spreader $t$ inserted, preparatory to casting.

Figure 14:
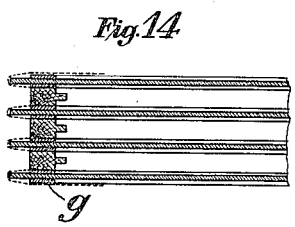
Figs. 14–16 show different arrangements of spacing strips in cross-section.
Figure 15:
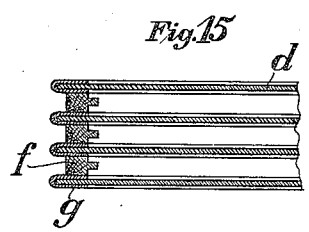
Figure 16:
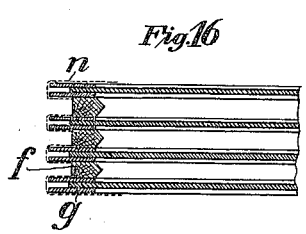

Other modes of arrangement of the spacing strips may be used. For example, the mould sides $d$ may project beyond the spacing strips $g$ on their opposite sides, so that the reenforcing wires are extended beyond the mould, as in Fig. 14, or the spacing strips may be U-shaped in cross section encompassing the edges of the mould sides as in Fig. 15. The spacing strips may also extend beyond the edges of the mould sides $d$ as in Fig. 16, thus forming a groove at the edge of each mould side on the outside of the mould, and across which the reenforcing wires extend. This last form is very advantageous to cutting the reenforcements apart, as a cutting tool or shears can readily be passed in the groove under the wires or threads.

Figure 17:
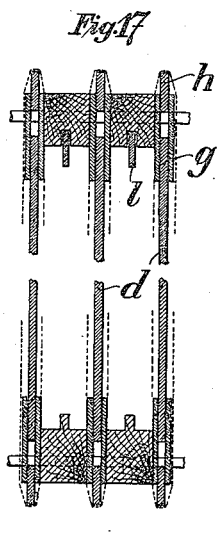
Figs. 17 and 18 are cross sections showing an improved form of spacing strips having steel edges.
Figure 18:
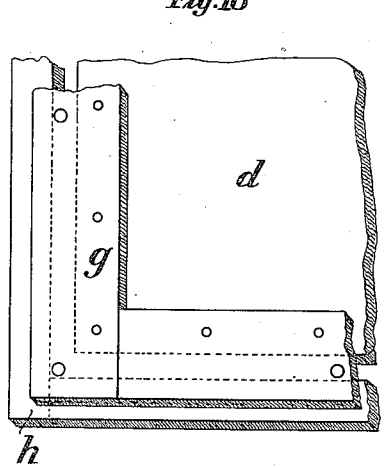
Figure 21:
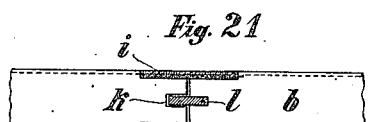
Figs. 21 and 22 are cross sections showing the edges of an element connected by a tongue and wire ends covered with cement.
Figure 22:
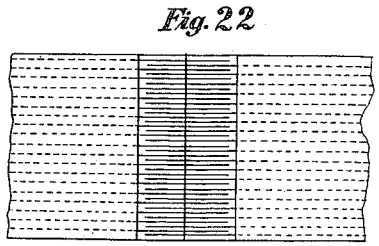

In Figs 17 and 18 I have shown another manner of arranging the off-set spacing strips $g$ which project beyond the sides. The clamping rods for holding the multiple mould together pass through the spacing strips $g$ which extend beyond the edges $d$ of the mould sheets. In the groove formed between a pair of spacing strips on the opposite sides of a mould sheet I insert flat steel bars $h$ resting against the clamping rods for the mould, the sharp corners of which facilitate the severing of the reenforcing wires, it being simply necessary to strike the wires with a hammer, to sever them. The mould parts $f$ having a groove in it is provided with a separate tongue strip $l$ of wood or other material. The slabs $b$ so formed make a joint, as illustrated in Figs. 21 and 22, where the edges of the slabs abut, the tongue $l$ of one slab entering the groove $k$ of the adjacent slab. The overlapping projecting ends of the reenforcements of the matched ends only have to be covered with cement, as at $i$ and the joint made smooth.

Figure 19:
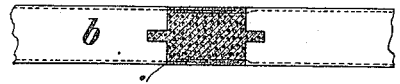
Figs. 19 and 20 are cross sections showing the formation of a strong joint between concrete slabs or semi-cylindrical shapes.
Figure 20:
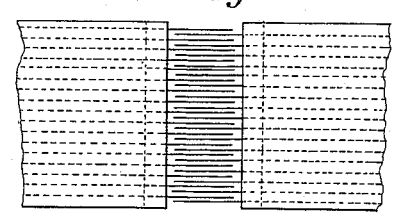

In other forms, as in Figs. 19 and 20, a joint is made where not only the reenforcements have to be surfaced as at $i$, but also the space between the slabs and their grooves have to be filled with cement.

The reenforcements may be wound by machine, the form plate being rotated or remaining stationary.

Figure 23:
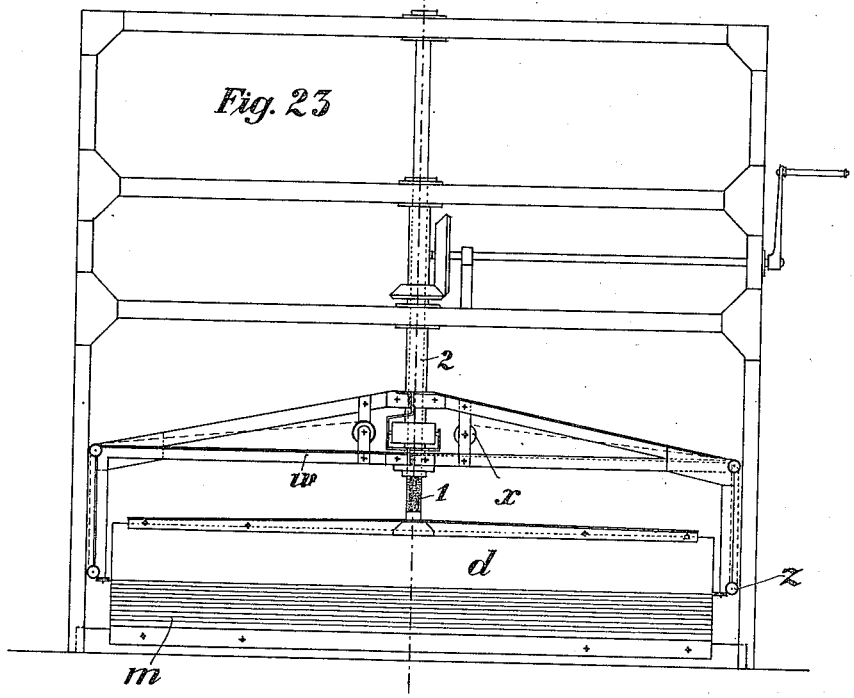
Fig. 23 is an elevation of the device for winding the equally spaced reenforcements on the mold parts.
Figure 24:
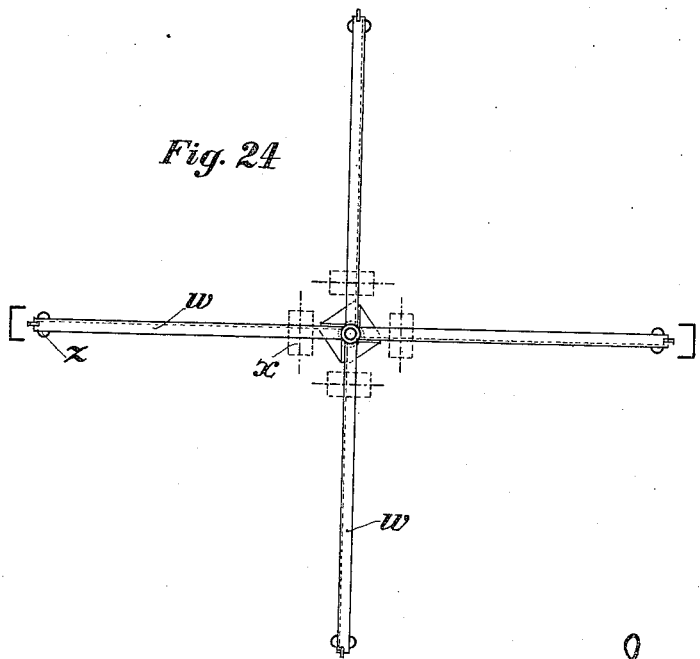
Fig. 24 is a plan of a device for simultaneously winding four wires or threads.

In Figs. 23 and 24 the mould side or sheet $d$ is placed lengthwise in a machine having a beam $w$ that carries the supply spools $x$ for the wire that is supplied at $z$ to the sheet to be wound. The beam $w$ is rotated by a handle, and suitable gearing, on a stationary screw 1, the sleeve 2 carrying said beam travelling along the screw as the rotation proceeds. The two wires are thus simultaneously spirally wound about the side of the mould, and if desired four wires may be so wound by providing the beam $w$ with four arms instead of two as shown in Fig. 24.

In the above device the mould side or sheet is stationary, but the mould sheet may be rotated.

In Figs. 25-27 I have shown an apparatus comprising a vertical frame having at its top and bottom stub shafts 3 between which are clamped the mould side $d$ with the spacing strips $g$ at its margins. The upper stub shaft carries a bevel pinion meshing with a bevel gear wheel on a horizontal shaft that is rotated by a chain 4 from a crank or motor. The horizontal shaft drives, by means of worm and worm wheel, a pulley 5 from which is suspended by a rope the wire guide $z$, travelling between vertical guides $y$. As the mould sheet $d$ rotates the wire guide rises and so spirally winds the wire about the mould sheet $d$.

The end mould sheets $d$ of a multiple mould need not have the reenforcements on both faces, and so I place the two end sheets together and wind the wire about the two, cut the wires at their edges and bend the ends of the wires over the ends of the sheets, thus providing reenforcements on one side only.

Figure 3:
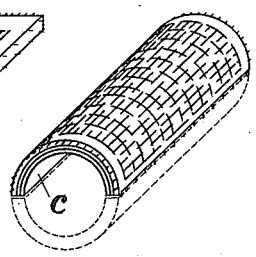
Fig. 3 is a perspective view of a semi-cylindrical channel or gully with fine wire reenforcement on the exterior surface.
Figure 4:
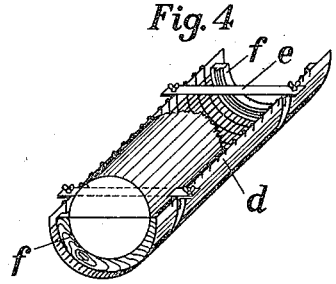
Fig. 4 illustrates the mould for the making of the semi-cylinders.

Such an arrangement of reenforcements may also be used for making gullies or semi-cylindrical pipe, as in Figs. 3 and 4, or for ceilings and walls.

When making curved forms as in Fig. 3, the mould sheet is of flexible sheet metal that is bent to curved form with the reenforcements on the inside and held to shape by straps or supports $e$. After semicircular tongue and groove ends have been placed, as in Fig. 4, a semi-cylindrical or cylindrical core is placed in these circular ends, the plastic material is poured. This results in a pipe or curved shape reenforced on the external surface, instead of the reenforcement being embedded within the thickness of the pipe.

I thus form complete pipe, by making half cylinders placing them together and cementing the meeting edges, which, in making a continuous pipe line, is very advantageous, as each half cylinder may be connected over the joint of two other half cylinders, i. e. the joints may be broken somewhat, as in the laying of two brick courses.

When forming walls and ceilings, the mould sheet is provided on one side with reenforcements then placed, spaced, against the wall or ceiling, the plastic, cement, or equivalent placed between the sheet and structural parts. After setting, the reenforcements are loosened from the mould sheet and the sheet is removed.

It will be noted that the reenforcements are of fine or filamentous character, readily flexible and easily cut, and can be rapidly wound and otherwise flexed whether they be of fine wire or fibres or small cord, and as such are of an entirely different character, and have a decidedly more facile manipulation than the rods, bars and other rolled shapes customarily used.

I claim—

1. The method of making reenforced building elements, which comprises placing the reenforcements in the mould spaced from its sides, then forcing and holding the reenforcements against the mould sides and pouring the plastic material.

2. The method of making reenforced building elements, which comprises placing the reenforcements in a mould spaced from the mould walls with the ends of the reenforcements projecting from the mould, then spreading the reenforcements within the mould against the mould sides and pouring in the plastic material.

3. The method of making reenforced building elements, which comprises winding mould sheets with reenforcements, assembling the mould sheets in a mould with their edges protruding, pouring the plastic material into the mould and cutting the reenforcements at the protruding edges.

4. The method of making reenforced building elements, which comprises winding mould sheets having marginal spacing strips with reenforcements, assembling the sheets in moulds, spreading the reenforcements within the mould cavity into contact with the sheet and filling the mould.

5. The method of making reenforced building elements, which comprises positioning filamentous reenforcements in a mould spaced from the mould walls, holding the reenforcements into contact with the mould walls, pouring the mould, and removing the holding means before the casting has set.

6. The method of making reenforced building elements, which comprises winding a pair of moulding sheets having marginal spacing strips with reenforcements, cutting the wound reenforcements between the edges of the sheets and bending them over the edges to provide sheets having reenforcements on one side only.

7. The method of making reenforced building elements, which comprises spirally winding a mold sheet having marginal spacing strips, assembling the sheets in a mould, causing the reenforcements to lie against the sheet by spreaders, pouring the casting and removing the spreaders before the casting has set.

8. The method of making reenforced building elements which comprises providing a flexible mould sheet with filamentous reenforcements on its surface, bending the sheet and reenforcements, holding the sheet to its bent form around a core and pouring the casting, whereby the reenforcements lie on the exterior of the casting.

9. The method of making reenforced building elements, which comprises rotating a moulding sheet having marginal spacing strips, and spirally winding reenforcements about said sheet, spacing such sheets by tongue and groove mold parts, spreading the reenforcements to contact with the faces of the sheet, casting the element and severing the reenforcements at the edges of the sheet.

10. The method of making reenforced building elements, which comprises binding reenforcements together by a cement on a form and then pouring the form.

11. The method of making reenforced building elements, which comprises binding fine, filamentous reenforcements together on a form with a cement, and then pouring the form, the body of the form and cement-connected reenforcements simultaneously setting.

12. The method of making reeenforced building elements, which comprises applying fine, filamentous reenforcements to the sides of flat mold parts, assembling the parts in a mold with the marginal portions of the reenforcements spaced toward the interior of the mold cavity, and pouring the mold, whereby the reenforcements are deflected toward the surface of said parts and lie at the surface of the finished element.

13. The method of making reenforced building elements, which comprises winding a flat form part spirally with a fine filamentous reenforcement under tension, assembling the part in a mold and pouring cement into said mould.

14. The method of making reenforced building elements, comprising winding a filamentous reenforcement on flat mold parts having marginal off-sets, assembling such parts in a mold, pouring cement into the mold and cutting the reenforcements at the edges of such parts, whereby a building element is produced whose reenforcements lie at the surface of the element within the marginal off-sets and the ends of the reenforcements lie toward the middle of the element at such marginal off-sets.

In testimony whereof I have signed my name to this specification.

KARL WETTSTEIN.